Patented Mar. 17, 1931

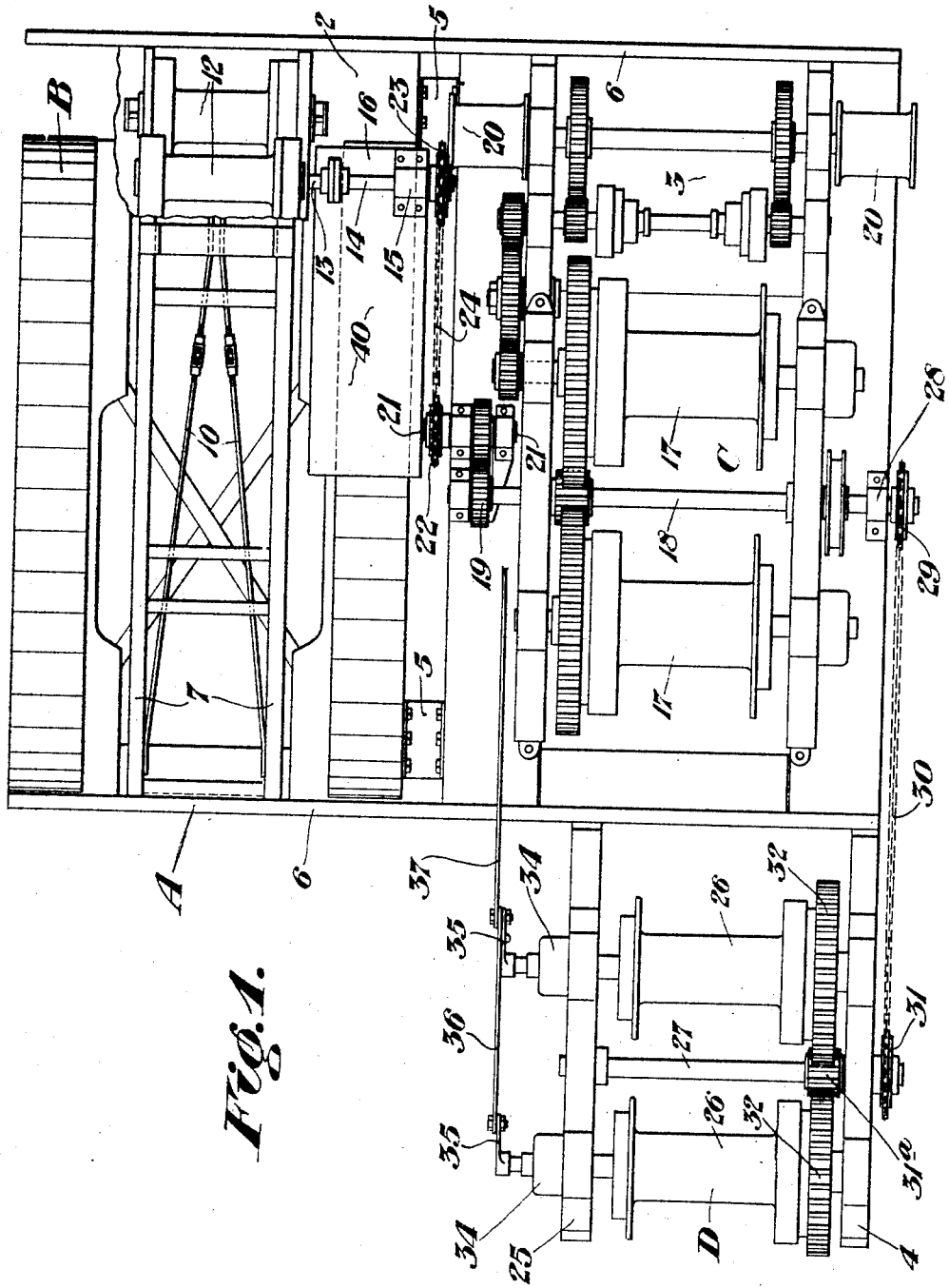

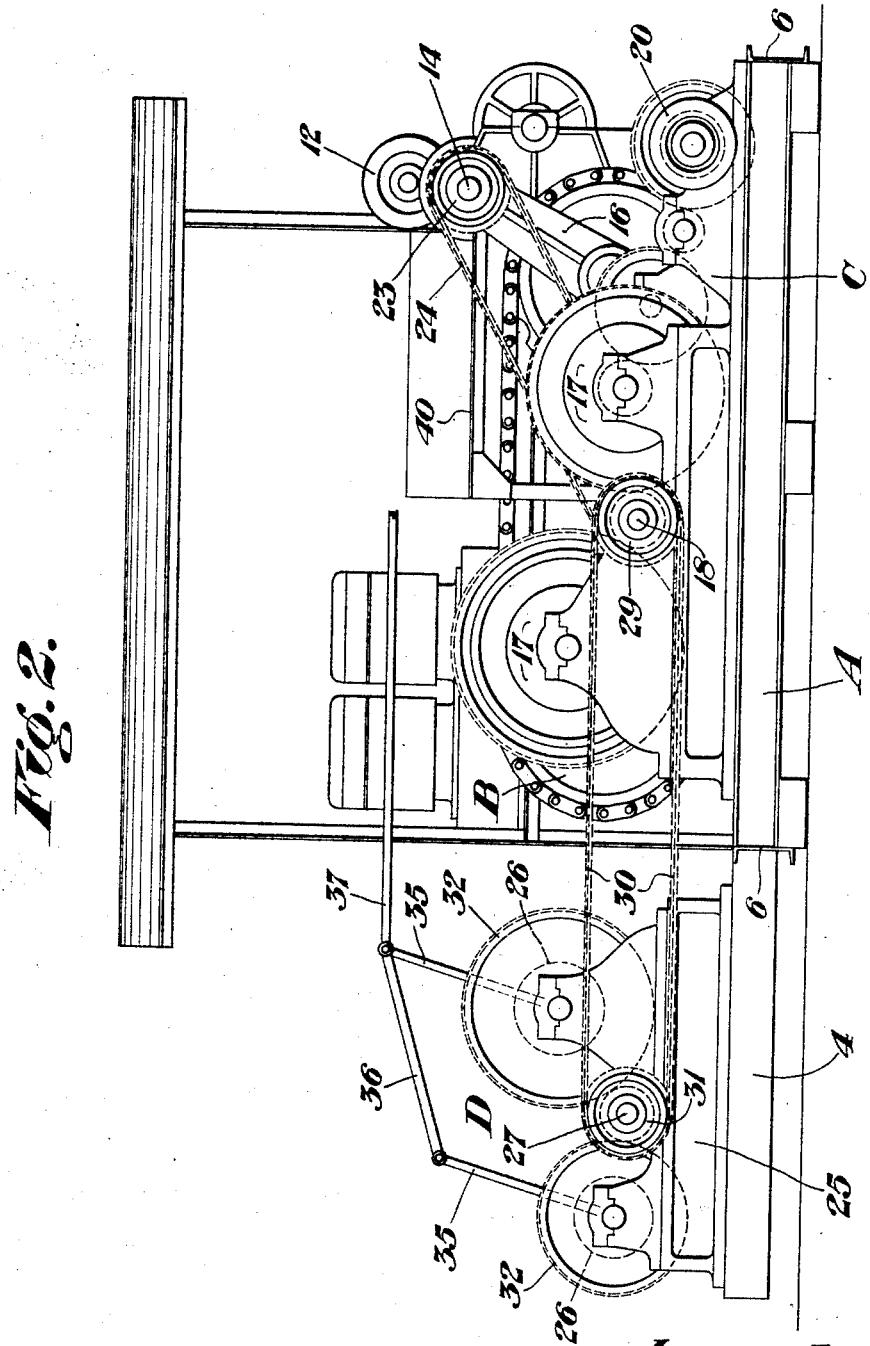

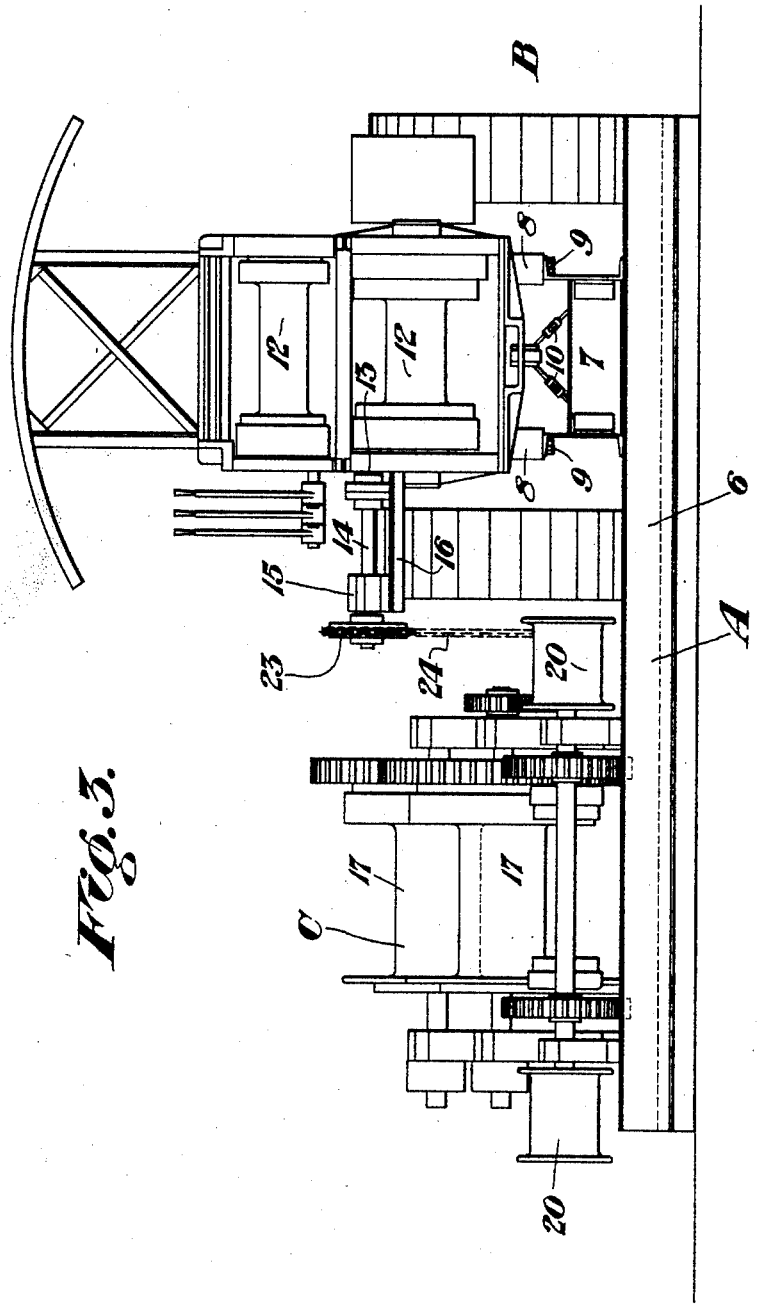

1,796,705

UNITED STATES PATENT OFFICE

JAMES L. DE VOU, OF PITTSBURGH, PENNSYLVANIA

ERECTING APPARATUS

Application filed May 23, 1929. Serial No. 365,498.

This invention relates to erecting apparatus and more particularly to erecting apparatus for use where any hoisting or pulling is to be accomplished, and has for its object the cheapening and simplification of the operation incident to the erection of bridges, buildings or any similar structures.

Another and general object of this invention is to provide a novel arrangement and application of power tractors, hoisting apparatus, bed or base frames, and transmissions to the hoisting and handling of materials safely and economically, and to prevent the duplication of equipment.

A further object is to provide the apparatus of this invention with a power unit which may be used as a separate mobile piece of mechanism as a tractor to perform many necessary, useful and speedy services on construction work and which also, in combination with a platform or base-frame, hoisting apparatus, traversing apparatus and transmission, may be used as a power unit to hoist materials and work-pieces for erection.

In the drawings—

Figure 1 is a plan of an erecting apparatus constructed in accordance with this invention.

Figure 2 is a side elevation thereof.

Figure 3 is a forward end elevation thereof.

Referring more particularly to the drawings, the letter A designates the base frame as a whole, which is made in three sections 2, 3 and 4, respectively. The section 2 is adapted to support a power tractor B which is detachably secured in position, the section 3 has a hoisting apparatus C fixedly mounted thereon and the section 4 has a traversing apparatus D fixedly mounted thereon.

The base-frame sections 2 and 3 are detachably secured together to form a rigid structure by bolted diaphragms 5 and continuous end channel splice members 6 which are also bolted to the sections 2 and 3. The section 4 has its forward end bolted to the rear end of the section 3 by bolts which preferably pass through the rear splice channel 6 and the rear end of the frame section 3.

The frame section 2 is provided with a rigid tractor supporting base 7 of slightly less height and width than the clearance under the tractor B. The tractor B is adapted to be moved onto the frame section 2 under its own power and to be secured in position on the base 7 by filler blocks 8 and bolts 9 and tie rods 10.

The tractor B is of standard construction and has two hoisting drums 12 which have a high and low speed. A power take-off shaft 13 is provided as usual, however, this shaft is extended, as at 14, so as to project beyond the side of the tractor and is supported by a bearing box 15 mounted on a bracket 16.

The hoisting apparatus C is of standard design and comprises a suitable base and supporting structure, a pair of hoisting drums 17, a drive-shaft 18 operable through a suitable transmission 19, and a pair of reversible auxiliary drums 20 adapted to be used for swinging a derrick or as wire rope "niggerheads."

The transmission 19 has its power shaft 21 provided with a sprocket 22 which is connected with a sprocket 23 on the extension 14 of the tractor power take-off shaft 13 by a drive chain 24 forming a detachable drive connection.

The traversing apparatus D comprises a bed frame 25, two drums 26, a drive-shaft 27 and suitable gearing and controls. The hoisting apparatus drive-shaft 18 is extended beyond its bearing 28 and is provided with a sprocket 29 which is connected by a chain 30 with a sprocket 31 on the drive-shaft 27.

The shaft 27 is provided with a pinion 31ª which engages spur gears 32 keyed to the shafts of the drums 26. Clutches 34 are provided and are connected so as to act simultaneously to throw one drum 26 into action and the other drum 26 out of action and conversely. The clutches 34 are connected by levers 35 and a rod 36 to a common lever rod 37.

An operator's platform 40 is provided between the tractor B and the hoisting apparatus C and all the controls for the several mechanisms will be centralized at this point so that a single operator may control the whole apparatus.

The novel combination described above is of particular advantage in erecting bridges and the like since the tractor will serve both as a tractor and hoisting power unit. Also, the construction is flexible in that the base-frame units may be put in line instead of side by side when space so requires. Also, the construction is such that the base-frame units may be readily dissembled for shipping and the tractor may be used to load the several parts of the structure onto cars or other vehicles for shipment.

The structural details of the tractor, hoisting apparatus and traversing apparatus are not shown nor described in detail, except where they are modified for the particular combination of this application, since they are standard commercial units.

While I have shown and described a certain specific embodiment of my invention I do not wish to be limited thereto since various modifications may be made without departing from the scope of my invention, as defined in the appended claims.

I claim—

1. An erecting apparatus comprising, in combination, a rigid base-frame, a hoisting apparatus mounted on said frame, a drive-shaft for said hoisting apparatus, a traversing mechanism mounted on a sub-base to the rear of and secured to said base-frame, a drive-shaft for said traversing mechanism, means forming a drive connection between said drive-shaft of said hoisting apparatus and said drive-shaft of said traversing mechanism, a power tractor, a tractor supporting base on said frame, means for removably securing said tractor to said base, a power take-off shaft on said tractor, and means forming a detachable drive connection between said power take-off shaft of said tractor and said drive-shaft of said hoisting apparatus.

2. An erecting apparatus comprising, a plurality of base-frames detachably secured together to form a rigid structure, a hoisting apparatus fixedly mounted on one of said frames, a traversing apparatus fixedly mounted on another of said frames, and a power tractor removably mounted on the other of said frames, a drive-shaft for said hoisting apparatus, a drive-shaft for said traversing apparatus, means forming a drive connection between said drive-shaft for said hoisting apparatus and said drive-shaft for said traversing apparatus, a power take-off shaft on said tractor, and means forming a detachable drive connection between said power take-off shaft of said tractor and said drive-shaft of said hoisting apparatus.

3. An erecting apparatus comprising a plurality of base-frames detachably secured together to form a rigid structure, a hoisting apparatus fixedly mounted on one of said frames, a traversing apparatus fixedly mounted on another of said frames, and a power tractor removably mounted on the other of said frames, a drive-shaft for said hoisting apparatus, a drive-shaft for said traversing apparatus, means forming a drive connection between said drive-shaft for said hoisting apparatus and said drive-shaft for said traversing apparatus, a power take-off shaft on said tractor, said shaft being extended beyond the side of said tractor, and means including transmission gearing and sprocket and chain drive for forming a detachable drive connection between said power take-off shaft of said tractor and said drive-shaft of said hoisting apparatus.

4. An erecting apparatus comprising, in combination, a rigid base-frame, a hoisting apparatus mounted on said frame, a power tractor, a tractor supporting base raised above the general plane of said frame, said supporting base having a height slightly less than the clearance under said tractor and a width less than the distance between the tractor treads so that said tractor may be moved over said base by its base by its own power, removable filler blocks arranged between the tractor frame and said tractor supporting base so as to support said tractor directly on said base, means for tying said tractor frame, said filler blocks and said tractor supporting base together, tie rods extending between said base frame and said tractor for preventing longitudinal movement of said tractor relative to said tractor supporting base, and means forming a drive connection between said tractor and said hoisting apparatus.

5. An erecting apparatus comprising, in combination, a rigid base-frame, a hoisting apparatus mounted on said frame, a power tractor, a tractor supporting base raised above the general plane of said frame, said supporting base having a height slightly less than the clearance under said tractor and a width less than the distance between the tractor treads so that said tractor may be moved over said base by its own power, removable means for securing said tractor to said base, a power take-off shaft on said tractor separate from the tractor propelling means, a drive-shaft for said hoisting apparatus, and means forming a detachable drive connection between said power take-off shaft of said tractor and said drive-shaft of said hoisting apparatus.

In testimony whereof, I have hereunto signed my name.

JAMES L. DE VOU.